Dec. 24, 1968  A. CZARNECKI  3,417,885
AUTOMATIC FRAME STACK TRANSFER DEVICE
Filed Sept. 20, 1965  3 Sheets-Sheet 1
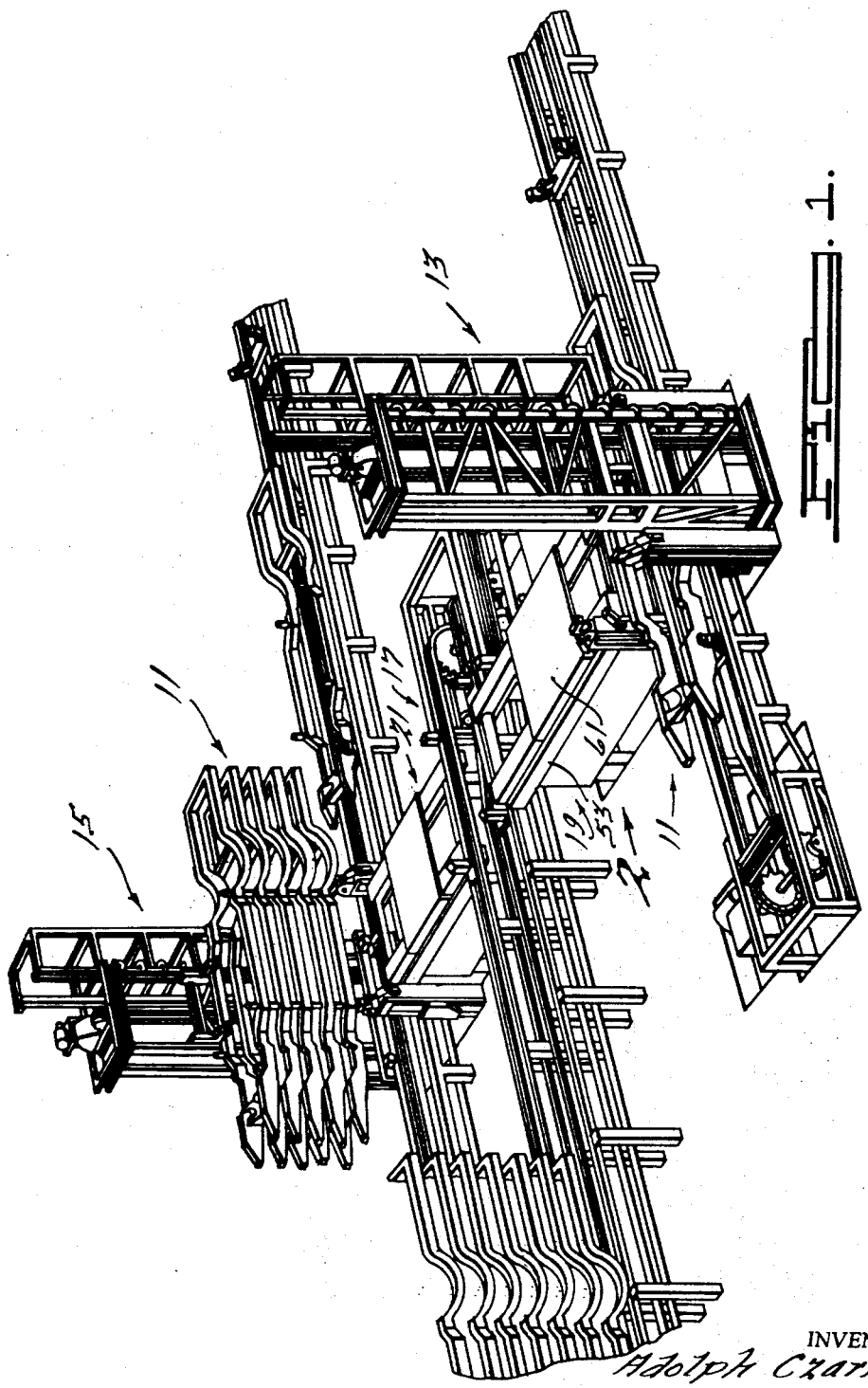
INVENTOR.
Adolph Czarnecki.
BY
Carness Dickey Pierce
ATTORNEYS

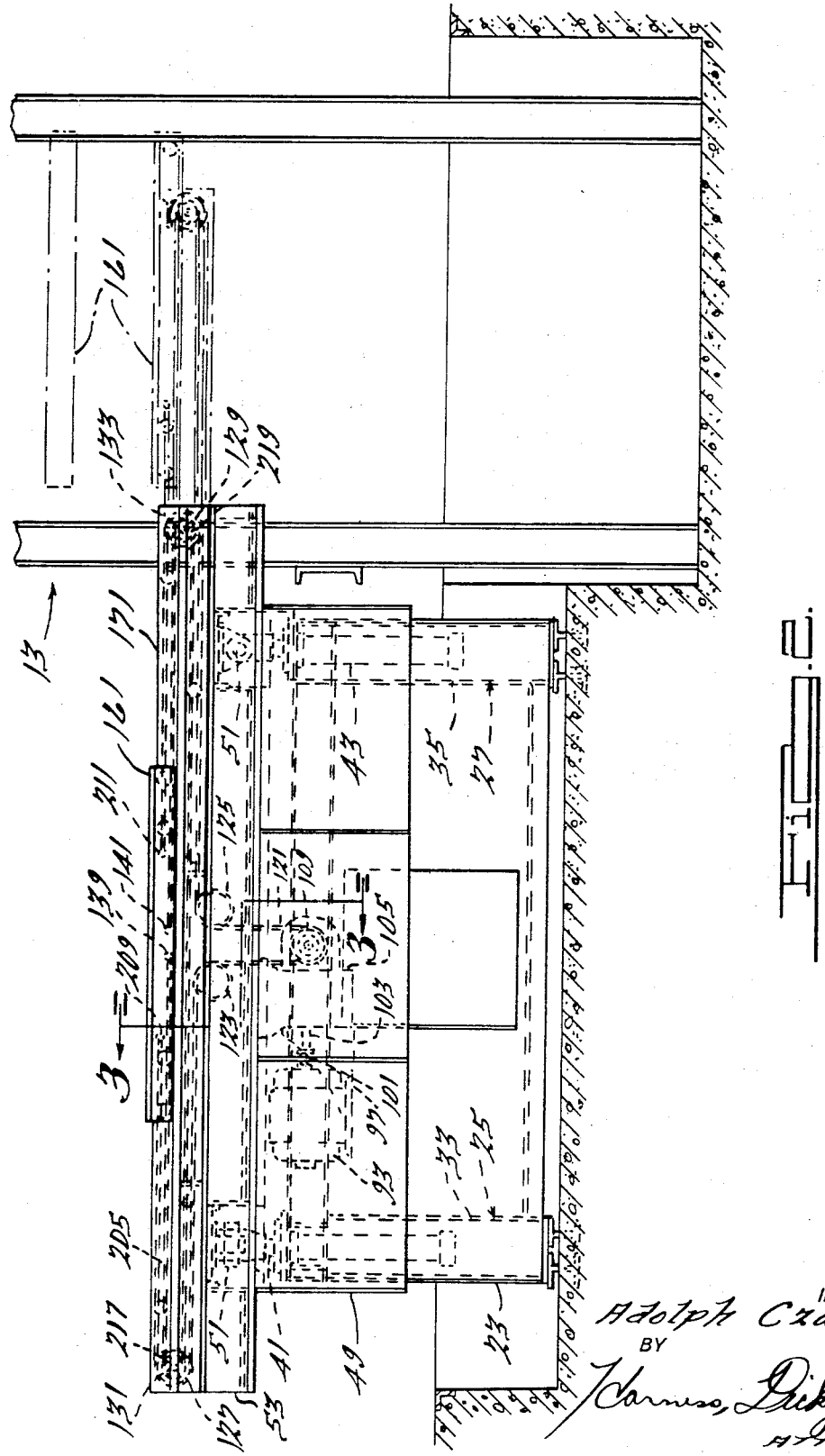

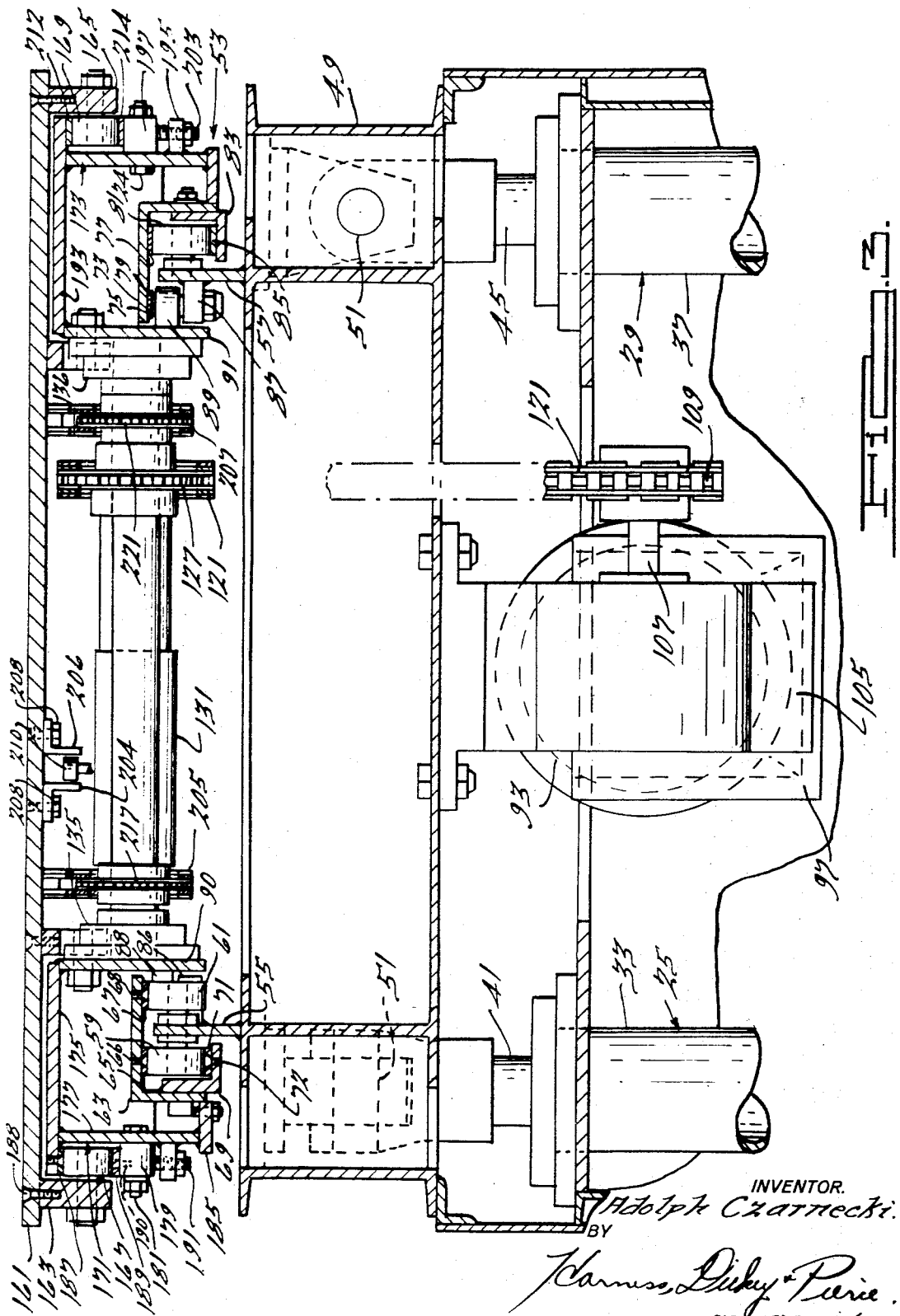

United States Patent Office 3,417,885
Patented Dec. 24, 1968

3,417,885
AUTOMATIC FRAME STACK TRANSFER DEVICE
Adolph Czarnecki, Birmingham, Mich., assignor, by mesne assignments, to Standard Alliance Industries, Inc., Chicago, Ill., a corporation of Delaware
Filed Sept. 20, 1965, Ser. No. 488,624
10 Claims. (Cl. 214—95)

ABSTRACT OF THE DISCLOSURE

A workpiece transfer device comprising a vertically movable support having an intermediate frame supported thereon and movable longitudinally thereof, a table on the intermediate frame and movable longitudinally relative thereto and to the support, rotatable drive means on the support, first linearly movable flexible means in driving engagement with the drive means and fixed to the intermediate support, second linearly movable flexible means interconnected with the first flexible means and fixed to the table whereby the drive means effects movement of the intermediate frame to longitudinally spaced positions relative to the support and the table to longitudinally spaced positions relative to the intermediate frame.

This invention relates generally to work handling, and particularly to a device adapted to lift, transfer and deposit stacks of relatively large and heavy workpieces from one workpiece support to another.

The device of the present invention is particularly useful in installations where the workpiece stacks are particularly heavy and where the supports prevent positioning relatively large and heavy transfer mechanism beneath the stack of workpieces to effect transfer. One example occurs in transferring stacks of automobile frames from a stacker to a conveyor or the like pursuant to delivering these stacks to trucks, railroad cars or to a storage area. Thus, it is necessary that the transfer device lift the stack of frames from the stacking device, transfer it to the conveyor and properly place it thereon. Because of their nature, the stacker and conveyor prevent the entire transfer device from moving into position beneath the workpiece stack to lift it from the stacker or to deposit it on the conveyor. Therefore, a device capable of transferring stacks of workpieces from one work support to another with a minimum of transferring device structure moving into the path of the work supports would be very desirable.

Main objects of the present invention are a work transfer device adapted to transfer relatively large and heavy stacks of workpieces from one work support to another with a minimum of the transfer structure moving into the path of the work supports and one which is capable of lifting the workpieces from one support and placing them on another.

Further objects include a work transfer device of the above character which is relatively compact and easily accommodated between two work supports, and one which is adapted for automatic operation in synchronism with and in response to other work handling structure.

Still futrher objects and advantages of the present invention will become more apparent from a consideration of the following detailed description taken in conjunction with the drawings in which:

FIGURE 1 is a perspective view illustrating a transfer device embodiying the present invention;

FIG. 2 is an enlarged side elevational view of a portion of the structure shown in FIG. 1 looking in the direction of the arrow "2"; and FIG. 3 is a sectional view of the structure of FIG. 2 taken along the line 3—3 thereof.

Broadly described, the present invention includes a vertically movable support having an intermediate, longitudinally movable frame disposed thereon supporting a table for longitudinal movement relative thereto and drive means on said support interconnected with said intermediate frame and table to effect movement of the intermediate frame to longitudinally spaced positions beyond the support and the table to longitudinally spaced positions beyond the intermediate frame.

Referring now more particularly to the drawings, FIG. 1 illustrates a typical installation for the present invention. As shown, workpieces 11, here shown as automobile frames, are stacked one on top of the other by one or more stackers 13, 15. When a full stack is completed at either stacker 13, 15, it is desirable that these stacks then be transferred to a conveyor 17 which, in turn, delivers the stacks to trucks, railroad cars, or simply to a storage area. The stackers 13, 15 illustrated are those illustrated and described in detail in the copending U.S. application, Ser. No. 488,521, filed Sept. 20, 1965 and owned by the assignee of the present application.

To effect transfer of the stacks of workpiece frame 11 to the conveyor 17, a pair of identical transefr devices 19, 21 embodying the present invention are provided intermediate the conveyor 17 and the stackers 13, 15, respectively. It is to be understood, however, that the transfer device of the present invention finds use in other similar work handling installations and the one illustrated here is by way of example, only. In addition, since the transfer devices 19, 21 are identical, a description of one will suffice here.

As seen in FIGS. 2 and 3, the transfer device 19 includes a generally rectangular rigid base 23 having a heavy duty fluid motor disposed adjacent each corner thereof. Three of these motors are shown at 25, 27, 29, it being understood that the other corner of the base 23 has an identical motor thereat. These motors are adapted to act conjointly and, as shown, include cylinders 33, 35, 37, suitably supported on and fixed to the base 23 and piston rods 41, 43, 45, respectively, secured to the underside of a support 49 through pivot pins 51. Means (not shown) is provided to conjointly deliver pressure fluid selectively to opposite ends of the cylinders 33, 35, 37 to reciprocate the piston rods 41, 43, 45 so that when the piston rods are extended, the support 49 is raised. Conversely, when the piston rods are retracted, the support 49 is lowered relative to the base 23.

An intermediate frame 53 is disposed atop the support 49 and is movable longitudinally relative thereto or from left to right as seen in FIG. 2. Thus, the support 49 has a pair of laterally spaced longitudinally extending upstanding webs 55, 57 (FIG. 3). The web 55 has a set of first spaced rollers 59 rotatably secured thereto along one side and a set of second spaced rollers 61 rotatably secured along the other side thereof. The intermediate frame 53 has one side thereof guidably supported on the rollers 59, 61 and is provided with a downwardly facing longitudinally extending angle 63 supported on the rollers 59, 61 through a pair of hardened wear plates 65, 67 fixed to the angle by screws 66, 68. A supplementary, somewhat smaller angle 69 welded or otherwise suitably fixed to the angle 63 is provided with a wear plate 71 secured thereto by screws 72 and adapted to engage the bottom of the set of rollers 59 during a portion of the travel of the intermediate frame 53 to keep it from tilting under a heavy cantilever type load in a manner hereinafter described. The other side of the intermediate frame 53 is similarly guidably supported on the web 57 through an angle 73 provided with hardened wear plates 75, 77 supported on sets of rollers 79, 81 rotatably secured to the web 57. A supplementary angle 83 fixed to the angle 73 has a hardened wear plate 85 engageable with the bottom of the rollers 81 during a portion of the travel of the intermediate frame 53 along the support 49 in the same manner as the wear plate 71. In addition to these supporting rollers, each of the webs 55, 57 has a lateral arm 86, 87 fixed thereto, respectively, each of which, in turn, rotatably supports a set of spaced rollers 88, 89, respectively, about generally vertical axes. As shown, these rollers 88, 89 are intermediate the rollers 61, 79, respectively, and rotatably engage one side of a respective elongated face plate 90, 91 forming a part of the intermediate frame 53 to laterally guide the intermediate frame during travel along the support 49.

Providing the motivating force for moving the intermediate frame 53 along the support 49 is a reversible electric motor 93, fixed to a reducer 105 by a bracket 97. The motor 93 has an output shaft 101 connected to an input shaft 103 of the reducer 105 also mounted on the bracket 97 and fixed to the support 49. An output shaft 107 of the reducer 105 is at right angles to the input shaft 103 and has a drive sprocket 109 fixed thereto over which an intermediate frame drive chain 121 passes. Both sides of the chain 121 extend upwardly from the sprocket 109 over a first set of idler sprockets 123, 125, respectively, rotatably supported by the support 49, and around a second set of idler sprockets 127, 129 fixed to shafts 131, 133. Each of the shafts 131, 133 is rotatably supported in bearings 135, 136 on the intermediate frame 53, only one set of these bearings being shown. The ends of the chain 121 are fixed to the intermediate frame 53 by pins 139, 141, at substantially a midpoint thereof. Upon actuation of the motor 93, the output shaft 107 rotates in one direction and turns the sprocket 109 therewith. The sprocket 109 causes the chain 121 to move linearly in one direction which is determined by the direction of rotation of the reducer output shaft 107. Since both ends of the chain 121 are fixed to the intermediate frame 53, linear chain movement in one direction causes the intermediate frame to move in one direction along the support 49. Specifically, as the chain 121 moves in one direction, it exerts a pulling force on one of its mounting pins 139, 141 while the force on the other of these pins is relaxed causing the intermediate frame 53 to move in the direction of pull. The idler sprockets 123, 125, 127, 129 all rotate freely on their mountings, the sprockets 123, 125 being fixed to the support 49 and the sprockets 127, 129 moving with their shafts 131, 133, which, of course, move with the intermediate frame. Conversely, when the motor 93 is reversed, a pulling force is exerted on the other of the pins 139, 141 causing the intermediate frame 53 to move in the opposite direction along the support 49. In both directions of travel, the intermediate frame 53 is supported and guided by the rollers 59, 61, 79, 81, 88 and 89, respectively.

A table 161 is supported atop the intermediate frame 53 for relative movement longitudinally thereof in the same direction as the intermediate frame moves relative to the support 49. As seen best in FIG. 3, the table 161 has a downwardly depending skirt 163, 165 at either side thereof upon which a plurality of spaced rollers 167, 169 are rotably supported about generally horizontal axes. The rollers 167 are positioned within channel-shaped openings 171, 173 in the intermediate frame 53. The opening 171 is formed by a top plate 175, a welded side plate 177 and a bottom bar 179 fixed to the side plate 177 by bolts 181 extending through vertical slots 182 in the plate 177. The top plate 175 is fixed to the face plate 90 to which the bearings 135, 137 for the shafts 131, 133 are also fixed. The side plate 177 is fixed to a bottom plate 185 also fixed to the angle 63. A hardened wear plate 187 fixed to the outer end of the top plate 175 within the channel opening 171 by screws 188 supports the one side of the table 61 on the rollers 167. A wear plate 189 is fixed to the bottom bar 179 by screws 190 and is positioned to engage the bottom of the rollers 167 when the table 161 is moved toward its outer limits of travel relative to the intermediate frame 53 in a manner described below. In addition, by loosening the bolts 181 and moving them vertically in the slots 182, the bottom bar 179 is adjusted vertically relative to the side plate 177. The bottom bar 179 additionally may be supported by adjustable screws 191.

The channel-shaped opening 173 at the other side of the table 161 is formed by an interconnected top plate 193, side plate 195 and bottom bar 197. The top plate 193 is fixed to the face plate 91 against which the side guide rollers 89 ride and which also has the bearings 136 for the sprocket shafts 131, 133 fixed thereto. The side plate 173 is fixed to a bottom plate 199, in turn, fixed to the angle 73. The bottom bar 197 is fixed to the side plate 195 by bolts 201 extending through slots 202 in the plate 195 and is supported in vertically adjustable positions by screws 203 in the same manner as the bottom bar 179 above. A top and bottom hardened wear plate 212, 214 are fixed to the top plate 193 and the bottom bar 197 and are positioned within the channel opening 173 to engage the rollers 169 in the same manner as the wear plates 187, 189 in the channel opening 171. The table is guided laterally by a pair of downwardly depending spaced angles 204, 206 fixed to the table 161 by screws 208 and which receive a plurality of longitudinally spaced rollers 210 fixed to the intermediate frame 53.

As described above, the table 161 is moved relative to the intermediate frame 53 in the same direction as the intermediate frame moves along the support 49. To achieve this, a pair of laterally spaced drive chains 205, 207 have their ends fixed to the table 161 by pins 209, 211 near the midpoint thereof. The chain 205 passes around a pair of sprockets 217, 219 fixed to the shafts 131, 133, respectively. Similarly, the chain 207 passes around a pair of sprockets spaced laterally from the sprockets 217, 219 and fixed to the shafts 131, 133, respectively, only one of these latter sprockets being shown at 221. Both of the chains 205, 207 assume an identical generally C-shaped configuration when mounted on their sprockets 217, 219 and 221, respectively. As described above, the shafts 131, 133 are rotatably supported on the intermediate frame 53 and are rotated when the chain 121 moves under the driving force of the motor 93. Thus, when the drive motor 93 is energized and the chain 121 moved to move the intermediate frame 53 along the support 49, the sprockets 127, 129 are driven causing the shafts 131, 133 to turn therewith. Since the sprockets 217, 219 and 221 are fixed to the shafts 131, 133, respectively, these sprockets also turn and cause the chains 205, 207 to travel in the same linear direction. Since the ends of the chains 205, 207 are fixed to the table 161, one end of each of these chains exerts a pulling force on the table in one direction, being the same direction as the pull exerted on the intermediate frame 53 by the chain 121, while the other end of the chains 205, 207 slackens. This causes the table 161 to move longitudinally along the intermediate frame 53 and in the same direction as the intermediate frame is moving along the support 49. Manifestly, the table 161 moves to its limits of travel when the intermediate frame 53 moves to its limits in the same directions.

In use, then, when the intermediate frame 53 moves to its limit of travel to the right, as seen in dot-dash lines in FIG. 2, the table 161 will have moved along the intermediate frame also to its limit of travel to the right as seen in the figure. Conversely, when the intermediate frame 53 moves to the left, the table 161 moves therealong to the left thereof. Thus, workpieces placed on the table 161 in one limit of its travel will travel from one position beyond one side of the intermediate frame 53 to another position beyond the other side thereof. In addition, the intermediate frame 53 moves in the same direction to increase the extent of travel that the table 161 undergoes along while providing strong support therefor.

Therefore, transfer of workpieces from one side of the base 23 to the other is effected by placing them on the table 161 and energizing the motor 93 and the only transfer mechanism which is moved into the positions of the supports from which the workpieces are received and delivered to is the table 161 itself. This is especially advantageous when only limited space below the workpieces being transferred is available to receive the transfer device mechanism. Such a condition exists in the installation illustrated in FIG. 1 where the stacker conveyor and the conveyor 17 block positioning a relatively large transfer device mechanism below the stack of workpieces 11 in either limit of travel of the transfer device.

In operation, the motors 25, 27, 29 are deenergized and the piston rods 41, 43, 45 are down when beginning operation of the transfer device. The motor 93 is energized to move the intermediate frame 53 and the table 161 to the right, as seen in FIG. 2, into position beneath the stack of workpieces 11 to be transferred, which, in this case, have been stacked on the stacking device 13. The motors 25, 27, 29 are then energized to raise the piston rods 41, 43, 45 thereby lifting the support 49 and, therefore, the intermediate frame 53 and the table 161 vertically upwardly which lifts the stack of workpieces 11 from the stacker 13. The electric motor 93 is then reversed causing the intermediate frame 53 and the table 161 to move to the left and position the stack of workpieces 11 above the conveyor 17. Thereafter, the motors 25, 27, 29 are reversed or deenergized and the piston rods 41, 43, 45 move downwardly lowering the support 49, the intermediate frame 53 and the table 161 to place the stack of workpieces 11 upon the conveyor 17. The electric motor 93 again reverses operation and moves the intermediate frame 53 and the table 161 back toward the stacker pursuant to the next transfer operation.

Suitable limit switches (not shown) may conveniently be provided to be actuated by the intermediate frame 53 or the table 161 to shut off power to the motor 93 when the intermediate frame and table reach each limit of their longitudinal travel. Also, suitable switches (not shown) may be provided to energize the motors 25, 27, 29 when the intermediate frame 53 and table 161 are below the stack of workpieces 11 on the stacker 13 to raise the table and to reverse or deenergize the motors 25, 27, 29 when the intermediate frame and table are above the conveyor. Switch and control means of this type are well known in the art and are within the realm of the skilled engineer, and since they form no part of the present invention, are not illustrated or described here.

When the intermediate frame 53 and the table 161 are moved to their limits of travel with the stack of workpieces 11 in place on the table 161, a considerable cantilever-type force is exerted thereon and it is at these points that lower wear plates 71, 85, 189, 214 engage the rollers 59, 81, 167, 169, respectively. Thus, this cantilever force bends the outward end of the table 161 and intermediate frame 53 downwardly with the inner ends thereof swinging upwardly causing the lower wear plates 71, 85, 189, 214 to engage the lower surface of the rollers 59, 81, 161, 169, respectively. Otherwise, the intermediate frame 53 and the table 161 are supported on the rollers 59, 61, 79, 81, 167, 169 through the wear plates 65, 67, 75, 77, 187, 212, respectively. Also, each of the four pivot mounting pins 51 are shown as oriented 90° relative to each adjacent pin 51 which allows some flexibility or bending of the intermediate frame 53 under severe loads without resultant wear on the piston rods 41, 43, 45 of the fluid motors 25, 27, 29, respectively.

As shown in FIG. 1, a pair of transfer devices 19, 21 embodying the present invention can be positioned, one adjacent a respective one of a pair of workpiece stackers 13, 15, such as are employed in the stacking system described in the copending U.S. application, Ser. No. 488,-521, filed Sept. 20, 1965 and owned by the assignee of the present invention. These transfer devices 19, 21 can be automatically operated to effect transfer of the workpieces 11 from the stackers 13, 15, when a complete stack of workpieces has been built up thereon to the conveyor 17 so that these workpiece stacks are automatically delivered to a shipping vehicle, such as, for example, a truck or railroad car, or simply to a storage area. In this fashion, efficient work handling is afforded by a transfer device constructed to occupy a minimum of space.

While a preferred embodiment of the present invention has been illustrated and described above in detail, various additions, substitutions, modifications and omissions may be made thereto without departing from the spirit of the invention as encompassed by the appended claims.

What is claimed is:

1. A workpiece transfer device comprising a vertically movable support having an intermediate frame supported thereon and movable longitudinally thereof, a table on said intermediate frame and movable longitudinally relative thereto and to said support, rotatable drive means on said support, first rotatable support means mounted on said intermediate frame at spaced longitudinal positions, first linearly movable flexible means drivingly interconnecting said drive means and said first rotatable support means and fixed to said intermediate frame, second rotatable support means mounted coaxially of and interconnected for conjoint rotation with said first rotatable support means, second linearly movable flexible means drivingly interconnected with said second rotatable support means and fixed to said table, whereby said drive means effects movement of said intermediate frame to longitudinally spaced positions relative to said support and said table to longitudinally spaced positions relative to said intermediate frame.

2. A workpiece transfer device comprising a vertically movable support having an intermediate frame supported thereon and movable longitudinally thereof, a table on said intermediate frame and movable longitudinally relative thereto and to said support, rotatable drive means on said support, first rotatable support means mounted on said intermediate frame at spaced longitudinal positions, first driven means drivingly interconnecting said drive means and said first rotatable support means, second rotatable support means mounted coaxially of and interconnected for conjoint rotation with said first rotatable support means, second driven means on said table drivingly interconnected with said second rotatable support means and fixed to said table, whereby said drive means effects movement of said intermediate frame to longitudinally spaced positions relative to said support and said table to longitudinally spaced positions relative to said intermediate frame.

3. A workpiece transfer device comprising a vertically movable support having an intermediate frame supported thereon and movable longitudinally thereof, a table on said intermediate frame and movable longitudinally relative thereto and to said support, a rotatable drive motor on said support and having a drive sprocket fixed thereto, a first pair of sprockets rotatably mounted on said intermediate frame at spaced longitudinal positions, first chain means drivingly interconnecting said drive sprocket and said first pair of sprockets and fixed to said intermediate table, a second pair of sprockets mounted coaxially of and interconnected for conjoint rotation with said first pair of sprockets and rotatably mounted on said intermediate frame at spaced longitudinal positions, second chain means drivingly interconnecting said second pair of sprockets and fixed to said table whereby said drive means effects movement of said intermediate frame to longitudinally spaced positions relative to said support and said table to longitudinally spaced positions relative to said intermediate frame.

4. A workpiece transfer device comprising a vertically movable support having an intermediate frame supported thereon and movable longitudinally thereof, a table on said intermediate frame and movable longitudinally relative thereto and to said support, a rotatable drive motor on said support and having a drive sprocket fixed thereto, a first pair of shafts rotatably supported on said intermediate frame at spaced longitudinal positions, a first pair of sprockets fixed to said first pair of shafts, respectively, a pair of idle sprockets rotatably mounted on said support above said drive sprocket, first chain means drivingly interconnecting said drive sprocket and said first pair of sprockets passing over said idler sprockets and fixed to said intermediate table, a second pair of sprockets fixed to said first pair of shafts, respectively, second chain means drivingly interconnecting said second pair of sprockets and fixed to said table whereby said drive means effects movement of said intermediate frame to longitudinally spaced positions relative to said support and said table to longitudinally spaced positions relative to said intermediate frame.

5. A workpiece transfer device comprising a vertically movable support, a plurality of first rollers rotatably mounted on said support at spaced longitudinal positions, an intermediate frame supported on said first rollers and movable longitudinally of said support, a table positioned above said intermediate support, a plurality of second rollers rotatably mounted on said table at spaced longitudinal positions and supporting said table for movement longitudinally of said intermediate frame, and drive means on said support interconnected with said intermediate frame and said table to effect movement of said intermediate frame to longitudinally spaced positions relative to said support and said table to longitudinally spaced positions relative to said intermediate frame, said drive means including a first pair of shafts rotatably supported on said intermediaate frame at spaced longitudinal positions, a first pair of sprockets fixed to said first pair of shafts, respectively, a pair of idler sprockets rotatably mounted on said support above said drive sprocket, first chain means drivingly interconnecting said drive sprocket and said first pair of sprockets passing over said idler sprockets and fixed to said intermediate table, a second pair of sprockets fixed to said first pair of shafts, respectively, second chain means drivingly interconnecting said second pair of sprockets and fixed to said table.

6. A workpiece transfer device comprising a vertically movable support, a plurality of first rollers rotatably mounted on said support about horizontal axes at spaced longitudinal positions, an intermediate frame supported on said first rollers and movable longitudinally of said support, a table positioned above said intermediate support, a plurality of second rollers rotatably mounted on said table about horizontal axes at spaced longitudinal positions and supporting said table for movement longitudinally of said intermediate frame, a plurality of third rollers rotatably mounted on said support about vertical axes, said intermediate frame having side walls means engaging said third rollers, and drive means on said support interconnected with said intermediate frame and said table to effect movement of said intermediate frame to longitudinally spaced positions relative to said support and said table to longitudinally spaced positions relative to said intermediate frame, said drive means including a first pair of shafts rotatably supported on said intermediate frame at spaced longitudinal positions, a first pair of sprockets fixed to said first pair of shafts, respectively, a pair of idler sprockets rotatably mounted on said support above said drive sprocket, first chain means drivingly interconnecting said drive sprocket and said first pair of sprockets passing over said idler sprockets and fixed to said intermediate table, a second pair of sprockets fixed to said first pair of shafts, respectively, second chain means drivingly interconnecting said second pair of sprockets and fixed to said table.

7. A workpiece transfer device comprising a vertically movable support, a plurality of first rollers rotatably mounted on one of said support and an intermediate frame about horizontal axes at spaced longitudinal positions, said intermediate frame supported by said support through said first rollers and movable longitudinally of said support, a table positioned above said intermediate support, a plurality of second rollers rotatably mounted about horizontal axes on one of said table and intermediate frame at spaced longitudinal positions and supporting said table for movement longitudinally of said intermediate frame, a plurality of third rollers rotatably mounted on one of said support and intermediate frame about vertical axes, the other of said support and intermediate frame having side wall means engaging said third rollers, and drive means on said support interconnected with said intermediate frame and said table to effect movement of said intermediate frame to longitudinally spaced positions relative to said support and said table to longitudinally spaced positions relative to said intermediate frame, said drive means including a first pair of shafts rotatably supported on said intermediate frame at spaced longitudinal positions, a first pair of sprockets fixed to said first pair of shafts, respectively, a pair of idler sprockets rotatably mounted on said support above said drive sprocket, first chain means drivingly interconnecting said drive sprocket and said first pair of sprockets passing over said idler sprockets and fixed to said intermediate table, a second pair of sprockets fixed to said first pair of shafts, respectively, second chain means drivingly interconnecting said second pair of sprockets and fixed to said table.

8. A workpiece transfer device comprising a vertically movable support, a plurality of first rollers rotatably mounted on one of said support and an intermediate frame about horizontal axes at spaced longitudinal positions, the other of said intermediate frame and support having channel means engageable with the top and bottom of said first rollers with said intermediate frame movable longitudinally of said support, a table positioned above said intermediate support, a plurality of second rollers rotatably mounted about horizontal axes on one of said table and intermediate frame at spaced longitudinal positions, the other of said table and intermediate frame having channel means engageable with the top and bottom of said second rollers and supporting said table for movement longitudinally of said intermediate frame, a plurality of third rollers rotatably mounted on one of said support and intermediate frame about vertical axes, the other of said support and intermediate frame having side wall means engaging said third rollers, and drive means on said support interconnected with said intermediate frame and said table to effect movement of said intermediate frame to longitudinally spaced positions relative to said support and said table to longitudinally spaced positions relative to said intermediate frame, said drive means including a first pair of shafts rotatably supported on said intermediate frame at spaced longitudinal positions, a first pair of sprockets fixed to said first pair of shafts, respectively, a pair of idler sprockets rotatably mounted on said support above said drive sprocket, first chain means drivingly interconnecting said drive sprocket and said first pair of sprockets passing over said idler sprockets and fixed to said intermediate table, a second pair of sprockets fixed to said first pair of shafts, respectively, second chain means drivingly interconnecting said second pair of sprockets and fixed to said table.

9. A workpiece transfer device comprising a vertically movable support, a plurality of first rollers rotatably mounted on either side of said support about horizontal axes at spaced longitudinal positions, an intermediate frame supported on said first rollers and movable longitudinally of said support, a table positioned above said intermediate support, a plurality of second rollers rotatably mounted on either side of said table about horizontal axes at spaced longitudinal positions and supporting said table for movement longitudinally of said intermediate frame, a plurality of third rollers rotatably mounted on either side of said support about vertical axes, said intermediate frame having side wall means engaging said third rollers, and drive means on said support interconnected with said intermediate frame and said table to effect movement of said intermediate frame to longitudinally spaced positions relative to said support and said table to longitudinally spaced positions relative to said intermediate frame, said drive means including a first pair of shafts rotatably supported on said intermediate frame at spaced longitudinal positions, a first pair of sprockets fixed to said first pair of shafts, respectively, a pair of idler sprockets rotatably mounted on said support above said drive sprocket, first chain means drivingly interconnecting said drive sprocket and said first pair of sprockets passing over said idler sprockets and fixed to said intermediate table, a second pair of sprockets fixed to said first pair of shafts, respectively, second chain means drivingly interconnecting said second pair of sprockets and fixed to said table.

10. A workpiece transfer device comprising a support having an intermediate frame supported thereon and movable longitudinally thereof, a table on said intermediate frame and movable longitudinally relative thereto and to said support, a rotatable drive means on said support, first driven means on said intermediate frame and in driving engagement with said drive means, said first driven means including a first pair of shafts rotatably supported on said intermediate frame at spaced longitudinal positions, a first pair of sprockets fixed to said first pair of shafts, respectively, a pair of idler sprockets rotatably mounted on said support above said drive sprocket, first chain means drivingly interconnecting said drive sprocket and said first pair of sprockets passing over said idler sprockets and fixed to said intermediate table, second driven means on said table interconnected with said first driven means whereby said drive means effects movement of said intermediate frame to longitudinally spaced positions relative to said support and said table to longitudinally spaced positions relative to said intermediate frame, said second driven means including a second pair of sprockets fixed to said first pair of shafts, respectively, second chain means drivingly interconnecting said second pair of sprockets and fixed to said table whereby said drive means effects movement of said intermediate frame to longitudinally spaced positions relative to said support and said table to longitudinally spaced positions relative to said intermediate frame, and means moving said support vertically upwardly when said intermediate frame and table are in one limit of longitudinal travel and moving said support vertically downwardly when said intermediate frame and table are in the other limit of longitudinal travel, said means including four generally rectangularly disposed fluid motors, each having extendable means fixed to said support by pivotal means, the axes of each said pivotal means being oriented 90° relative to each adjacent one of said pivotal means.

References Cited

UNITED STATES PATENTS

| | | | |
|---|---|---|---|
| 3,175,722 | 3/1965 | Paulssen | 214—16.4 X |
| 3,240,364 | 3/1966 | Kapnek et al. | 214—730 X |
| 3,313,429 | 4/1967 | Cole | 214—38 |
| 3,318,469 | 5/1967 | Bigler | 214—95 |
| 2,845,189 | 7/1958 | Sanders | 214—16.1 |

ROBERT G. SHERIDAN, *Primary Examiner.*